(12) United States Patent
Michel et al.

(10) Patent No.: US 10,691,738 B1
(45) Date of Patent: Jun. 23, 2020

(54) SYSTEM, METHOD, AND COMPUTER PROGRAM FOR TAGGING APPLICATION DATA WITH ENRICHMENT INFORMATION FOR INTERPRETATION AND ANALYSIS BY AN ANALYTICS SYSTEM

(71) Applicant: Amdocs Development Limited, Limassol (CY)

(72) Inventors: Christophe Regis Jean-jaques Michel, Chantepie (FR); Pierre-Erwann Gouesbet, Longaulnay (FR); Nicolas Pierre, Marpire (FR)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 248 days.

(21) Appl. No.: 15/670,959

(22) Filed: Aug. 7, 2017

(51) Int. Cl.
*G06F 17/30* (2006.01)
*G06F 16/35* (2019.01)
*G06F 40/117* (2020.01)

(52) U.S. Cl.
CPC ............ *G06F 16/35* (2019.01); *G06F 40/117* (2020.01)

(58) Field of Classification Search
None
See application file for complete search history.

(56) References Cited

U.S. PATENT DOCUMENTS

| | | | |
|---|---|---|---|
| RE41,440 E | 7/2010 | Briscoe et al. | |
| 7,937,393 B2 | 5/2011 | Prahlad et al. | |
| 8,387,110 B1* | 2/2013 | Cooper | H04L 63/102 726/1 |
| 9,721,212 B2* | 8/2017 | Gupta | G06N 20/00 |
| 9,983,807 B1* | 5/2018 | Tylik | G06F 3/0665 |
| 2002/0143764 A1 | 10/2002 | Martin et al. | |
| 2008/0228749 A1* | 9/2008 | Brown | G06F 16/7844 |
| 2011/0238609 A1 | 9/2011 | Aben et al. | |
| 2012/0053971 A1* | 3/2012 | Ludvigsen | G06Q 10/06 705/7.11 |
| 2013/0144605 A1 | 6/2013 | Brager et al. | |
| 2015/0201046 A1* | 7/2015 | Biswas | H04W 76/10 370/329 |
| 2015/0356451 A1* | 12/2015 | Gupta | G06N 20/00 706/52 |

(Continued)

FOREIGN PATENT DOCUMENTS

| | | |
|---|---|---|
| WO | 2012162816 A1 | 12/2012 |
| WO | 2015013215 A1 | 1/2015 |

OTHER PUBLICATIONS

Mead, D., "Laugh at Google's E-Tattoo All You Want, You'll Be Wearing One Soon," Motherboard Blog, Nov. 12, 2013, pp. 1-19, retrieved from, https://motherboard.vice.com/en_us/article/ae3w8a/laugh-at-googles-e-tattoo-all-you-want-youll-be-wearing-one-soon.

*Primary Examiner* — Hung D Le
(74) *Attorney, Agent, or Firm* — Zilka-Kotab, P.C.

(57) ABSTRACT

A system, method, and computer program product are provided for tagging application data with enrichment information for interpretation and analysis by an analytics system. In operation, a tagging system receives data from an application. The tagging system examines the data to identify characteristics associated with the data. Additionally, the tagging system tags the data with enrichment information based on the identified characteristics associated with the data and criteria including application specific context and logic, such that the data is capable of being interpreted and analyzed by an analytics system.

20 Claims, 7 Drawing Sheets

(56) References Cited

U.S. PATENT DOCUMENTS

| | | | |
|---|---|---|---|
| 2016/0019283 A1* | 1/2016 | Gibson | G06F 16/285 |
| | | | 707/610 |
| 2016/0260136 A1 | 9/2016 | Schwartz et al. | |
| 2017/0052930 A1* | 2/2017 | Quintana | G06F 17/218 |
| 2017/0093753 A1 | 3/2017 | Summers et al. | |
| 2018/0005157 A1* | 1/2018 | Narayan | G06Q 10/06316 |
| 2018/0174070 A1* | 6/2018 | Hoffman | G06N 7/005 |
| 2018/0225262 A1* | 8/2018 | Quintana | G06F 17/2229 |

* cited by examiner

SYSTEM, METHOD, AND COMPUTER PROGRAM FOR TAGGING APPLICATION DATA WITH ENRICHMENT INFORMATION FOR INTERPRETATION AND ANALYSIS BY AN ANALYTICS SYSTEM

FIELD OF THE INVENTION

The present invention relates to data analysis, and more particularly to tagging application data with enrichment information for interpretation and analysis by an analytics system.

BACKGROUND

Big Data Systems are being used across the world, in order to interpret data transported over networks to profile user experience, improve adoption, and predict issues, etc. However, all applications, include legacy applications that are still in use, have not been designed in a way such that the data they transfer over the network can be smartly assimilated by analytics systems. The manner in which data passed over the network can be interpreted is tightly coupled to the application logic and the services it provides.

Dropping raw data on a network, mixing a variety of information, such as real usage data, system logs and other data, without being able to categorize such data, leads to application usage that cannot be interpreted accurately and thus fails to allow for the use of Big Data analytics in such cases.

There is thus a need for addressing these and/or other issues associated with the prior art.

SUMMARY

A system, method, and computer program product are provided for tagging application data with enrichment information for interpretation and analysis by an analytics system. In operation, a tagging system receives data from an application. The tagging system examines the data to identify characteristics associated with the data. Additionally, the tagging system tags the data with enrichment information based on the identified characteristics associated with the data and criteria including application specific context and logic, such that the data is capable of being interpreted and analyzed by an analytics system.

DETAILED DESCRIPTION

Figure 1:
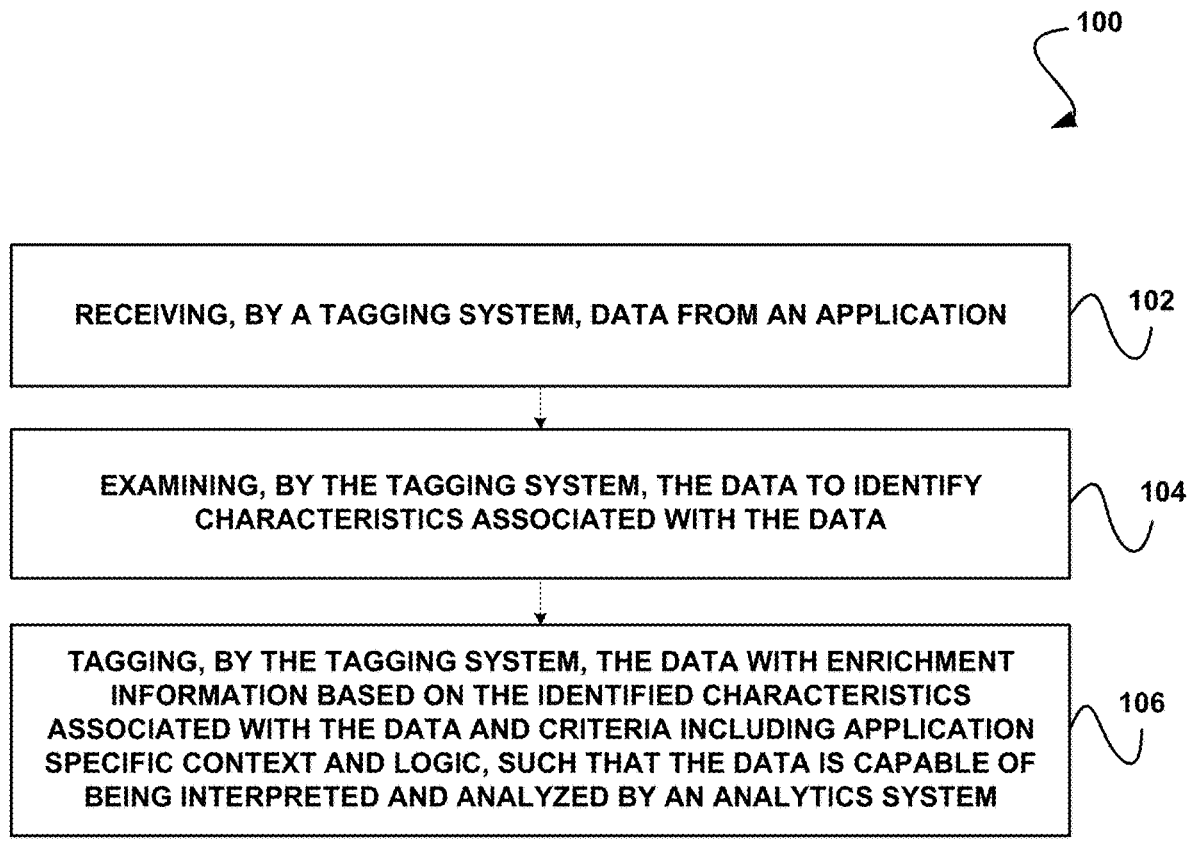
FIG. 1 illustrates a method for tagging application data with enrichment information for interpretation and analysis by an analytics system, in accordance with one embodiment.

FIG. 1 illustrates a method 100 for tagging application data with enrichment information for interpretation and analysis by an analytics system, in accordance with one embodiment.

In operation, a tagging system receives data from an application. See operation 102. The application may include any type of software application. The data may include any data that can be analyzed.

The tagging system examines the data to identify characteristics associated with the data. See operation 104. The characteristics associated with the data may include any data characteristics capable of being utilized to categorize the data and/or identify any aspect of the data. For example, in one embodiment, identified characteristics may include at least one of a keyword or a data pattern.

Additionally, the tagging system tags the data with enrichment information based on the identified characteristics associated with the data and criteria including application specific context and logic, such that the data is capable of being interpreted and analyzed by an analytics system. See operation 106. The enrichment information may include any information capable of providing additional context to the data. For example, in one embodiment, the enrichment information may include data categorization information.

The criteria including the application specific context and the logic may include any rules and/or information for which to look for in the data. For example, the application specific context may include the characteristics for which the tagging system should look for in the data. In one embodiment, the criteria may include patterns and keywords and corresponding rules for determining a proper categorization for the data based on the patterns and the keywords present in the data.

Further, in one embodiment, the enrichment information and the criteria including the application specific context and the logic may be represented as an application specific data model. In this case, the application specific data model may be provided to the tagging system by a server that maintains a plurality of application specific data models associated with a plurality of applications. In one embodiment, the tagging system may periodically query the server for an up-to-date application specific data model for the application.

It should be noted that the method 100 may be implemented utilizing various systems, hardware, software, applications, user interfaces, etc., as dictated by the implementer. For example, the tagging system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
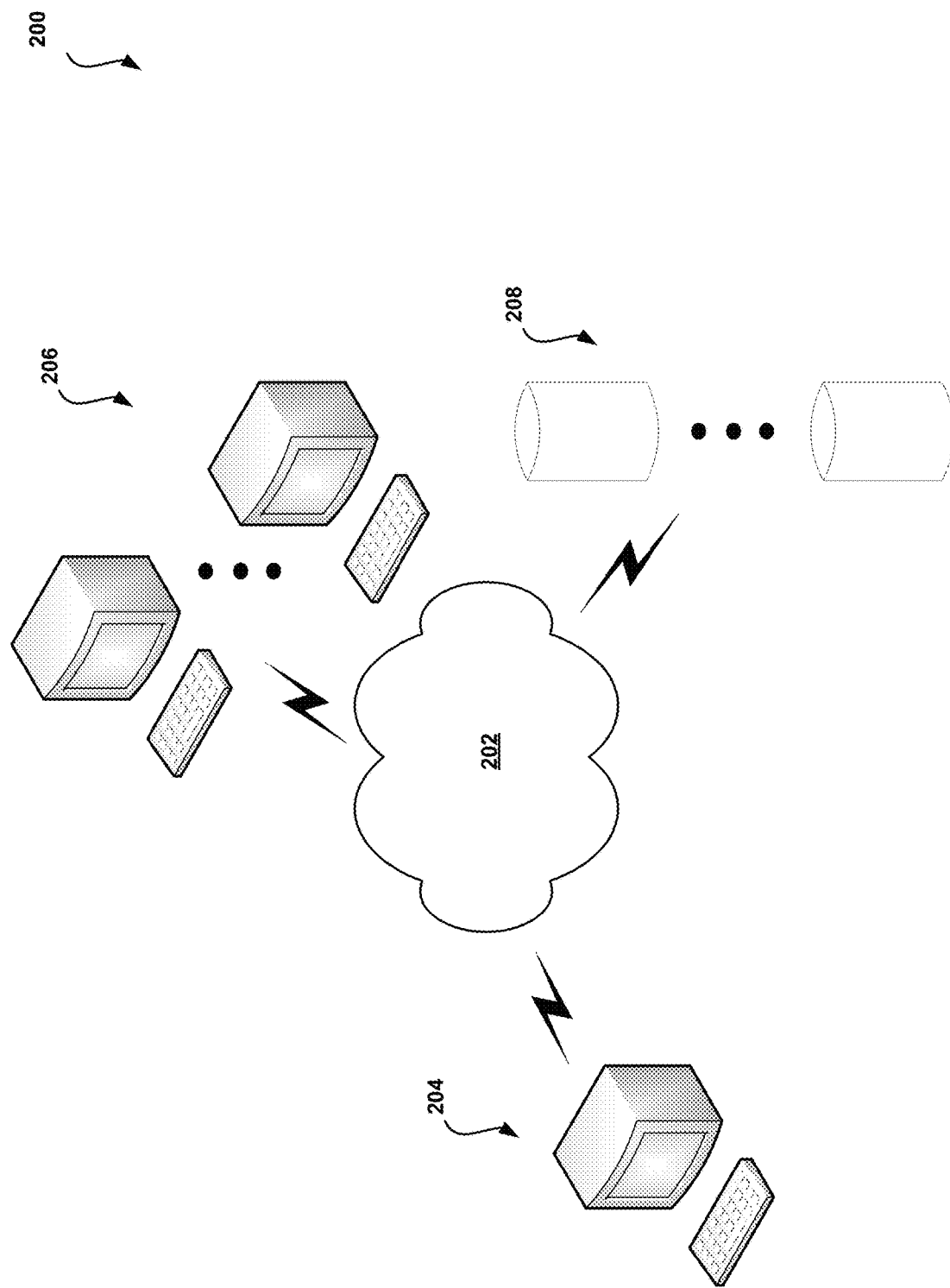
FIG. 2 shows a system for tagging application data with enrichment information for interpretation and analysis by an analytics system, in accordance with one embodiment.

FIG. 2 shows a system 200 for tagging application data with enrichment information for interpretation and analysis by an analytics system, in accordance with one embodiment.

As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a tagging system 204, which may implement a variety of applications or software, etc. The tagging system 204 may be capable of communicating with a plurality of systems 206, either directly or over one or more networks 202, for obtaining up-to-date tagging information and/or for communicating tagged data. The tagging system 204 may also be in communication with one or more repositories/databases 208.

Big Data Systems are being used across the world, in order to interpret data transported over networks to profile user experience, improve adoption, and predict issues, etc. However, all applications, include legacy applications that are still in use, have not been designed in a way such that the data they transfer over the network can be smartly assimilated by analytics systems. The manner in which data passed over the network can be interpreted is tightly coupled to the application logic and the services it provides.

Figure 3:
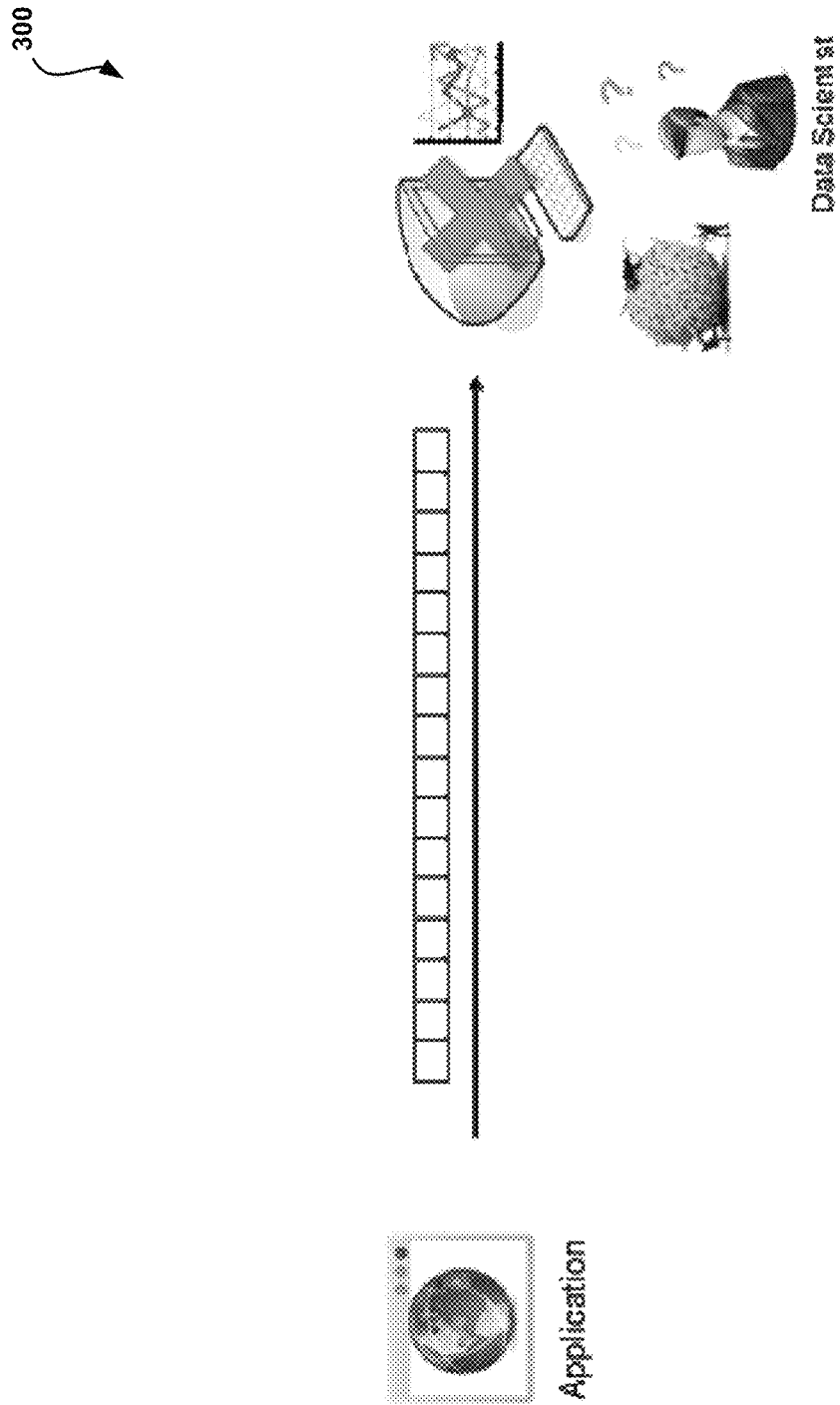
FIG. 3 shows a simplified diagram illustrating complexities associated with transferring application data to analytics systems.

Dropping raw data on a network, mixing a variety of information, such as real usage data, system logs and other data, without being able to categorize such data, leads to application usage that cannot be interpreted accurately and thus fails to allow for the use of Big Data analytics in such cases. FIG. 3 shows a simplified diagram 300 illustrating complexities associated with transferring application data to analytics systems.

To address these issues, among others, the tagging system 204 includes a client application with an embedded tagging module acting as a proxy/probe that analyzes data on the way to be transferred over a network in order to categorize it. Based on specific criteria (e.g. patterns, keywords, etc.), output data can be enriched by the tagging system 204 with a tag or "tattoo" that will contribute to drive how such data can be interpreted server-side by analytics systems.

Such criteria may be defined specifically tuned for an application, which is the place where the data can be smartly categorized at runtime, as the application owns and knows the logic of its services, compared to analytics systems, which are generic (although configurable) solutions.

As the tagging module is plugged into existing applications, it is applicable to use such module for any application, including legacy applications.

Figure 4:
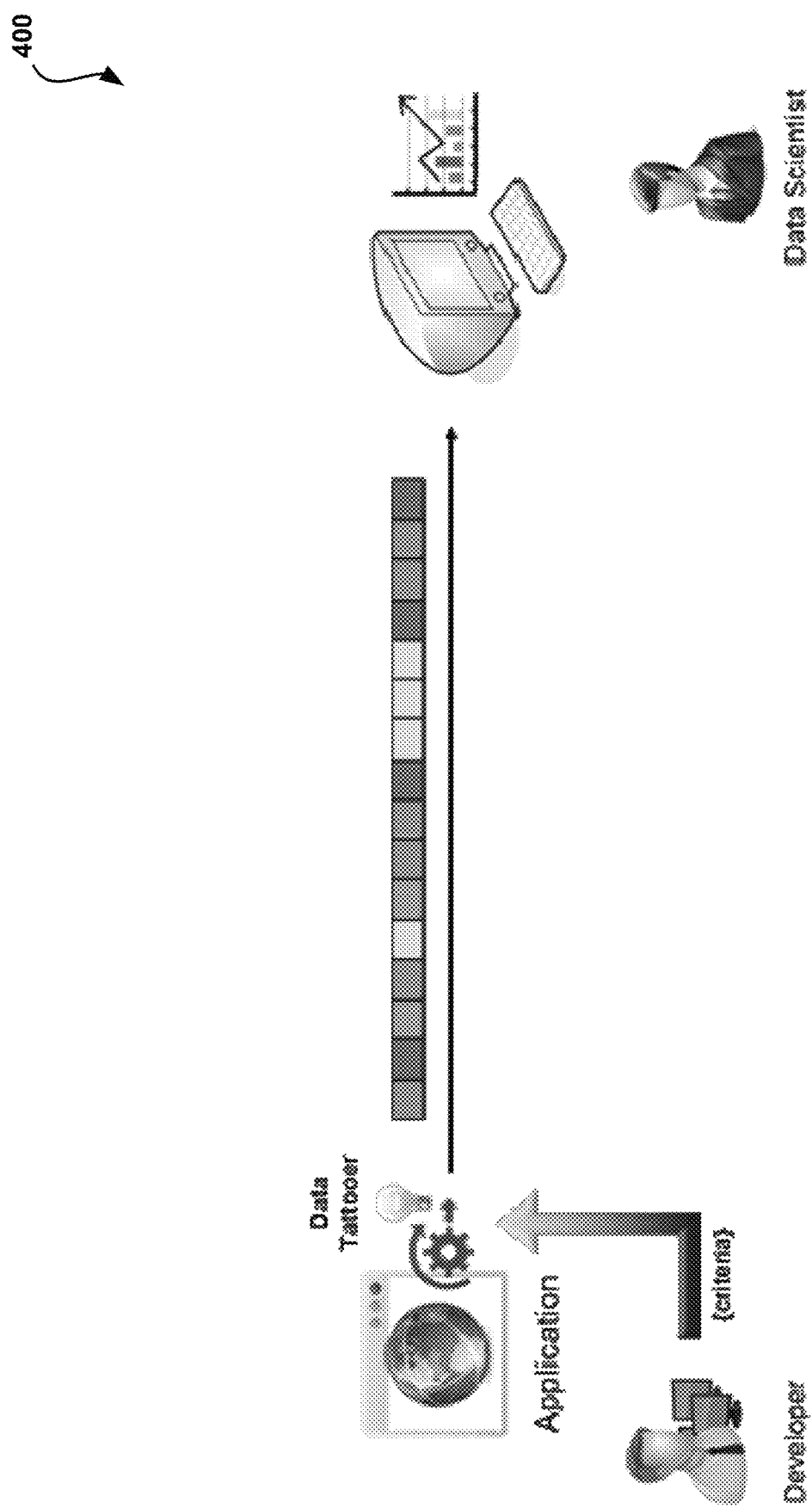
FIG. 4 shows a simplified system diagram for tagging application data with enrichment information for interpretation and analysis by an analytics system, in accordance with one embodiment.

FIG. 4 shows a simplified system diagram 400 for tagging application data with enrichment information for interpretation and analysis by an analytics system, in accordance with one embodiment. As an option, the system diagram 400 may be implemented in the context of the details of the previous figures and/or any subsequent figure(s). Of course, however, the system diagram 400 may be implemented in the context of any desired environment. Further, the aforementioned definitions may equally apply to the description below.

The diagram 400 illustrates a tagging system to enrich output data from any application with a proper categorization (e.g. a tattoo, tag, marker, etc.), based on application specific context and logic, so this data can be interpreted and suitably analyzed for various purposes (e.g. usage tracking, user profiling, debugging, etc.).

This tagging system allows for data enrichment with very limited integration effort in both new and existing applications.

As shown in the diagram 400, the tagging system implements a software component, an embedded tagging module represented as the "Data Tattooer", which can be integrated/packaged inside an existing application. The tagging system can utilize this embedded tagging module to intercept/proxy all output data. The tagging system may download up-to-date tattooing criteria from a centralized service (e.g. receiving an updated policy with periodicity that is configurable, etc.).

The tagging system may utilize the embedded tagging module to enrich/tattoo/tag data with a proper category (e.g. a tag, marker, etc.). In one embodiment, a descriptor such as a "Data Tattoo Model", may be utilized to specify criteria (e.g. patterns, keywords, etc.) specific to the application to ingest inside the proxy/probe software component (i.e. the embedded tagging module). The Data Tattoo Model maybe utilized to configure how to tattoo/tag each output data, with the proper category. The centralized server may automatically provide up-to-date versions of such criteria, which may be refined at any time, without requiring the re-distribution of the application itself (i.e. a new version does not need to be published).

Figure 5:
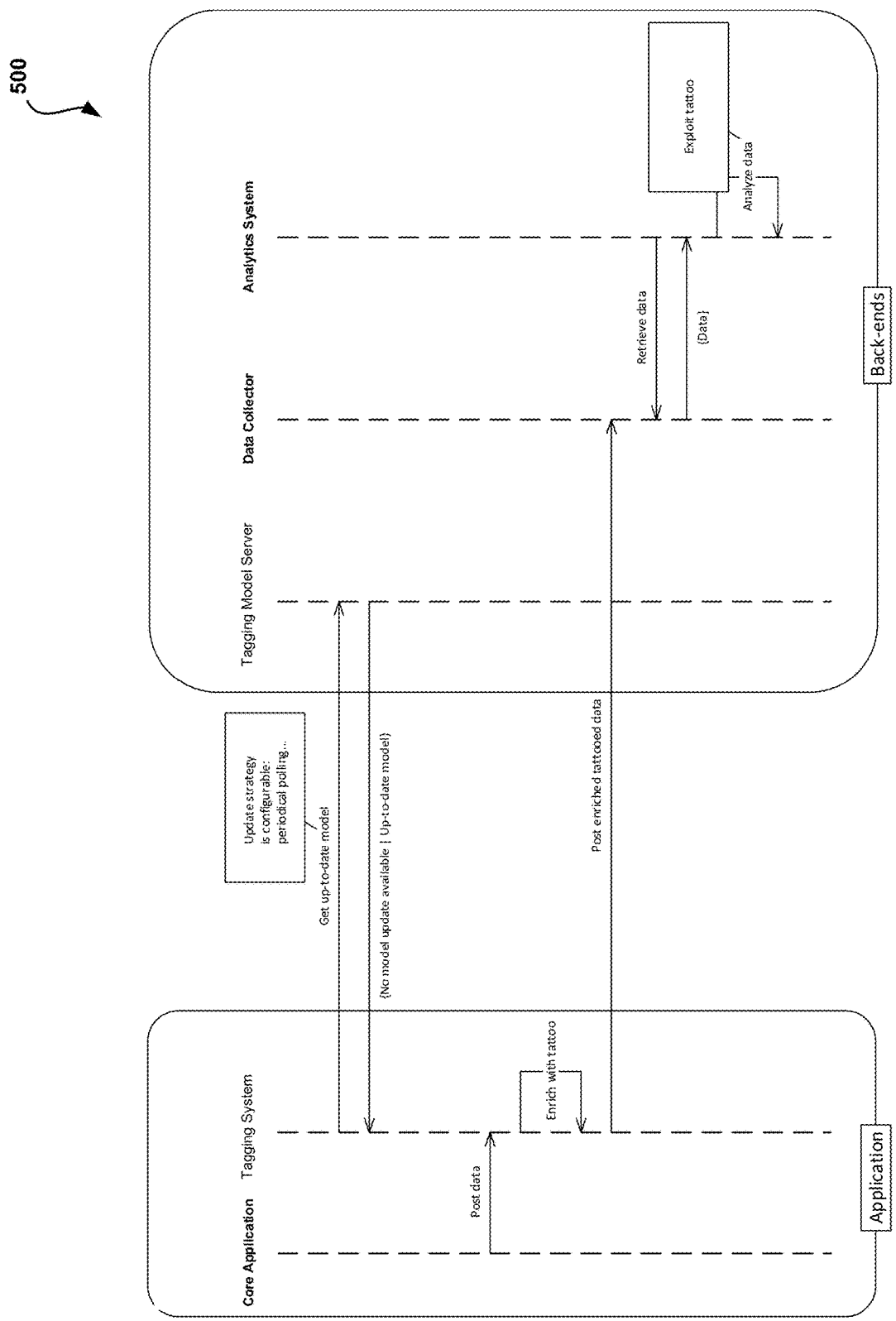
FIG. 5 shows a system flow diagram for tagging application data with enrichment information for interpretation and analysis by an analytics system, in accordance with one embodiment.

FIG. 5 shows a system flow diagram 500 for tagging application data with enrichment information for interpretation and analysis by an analytics system, in accordance with one embodiment. As an option, the system flow diagram 500 may be implemented in the context of the details of the previous figures and/or any subsequent figure(s). Of course, however, the system flow diagram 500 may be implemented in the context of any desired environment. Further, the aforementioned definitions may equally apply to the description below.

As shown, a tagging system queries a tagging model server for an up-to-date data model (e.g. periodically, upon request, etc.). If there is an up-to-date data model, the tagging model server sends the model to the tagging system.

When an application posts data, the tagging system enriches the data with a data tattoo (i.e. a tag with enrichment information). The tagging system posts the enriched tattooed data for a data collector system to access. An analytics system may then retrieve the data, examine the tattoo, and exploit the information stored in the tattoo for analysis.

Figure 6:
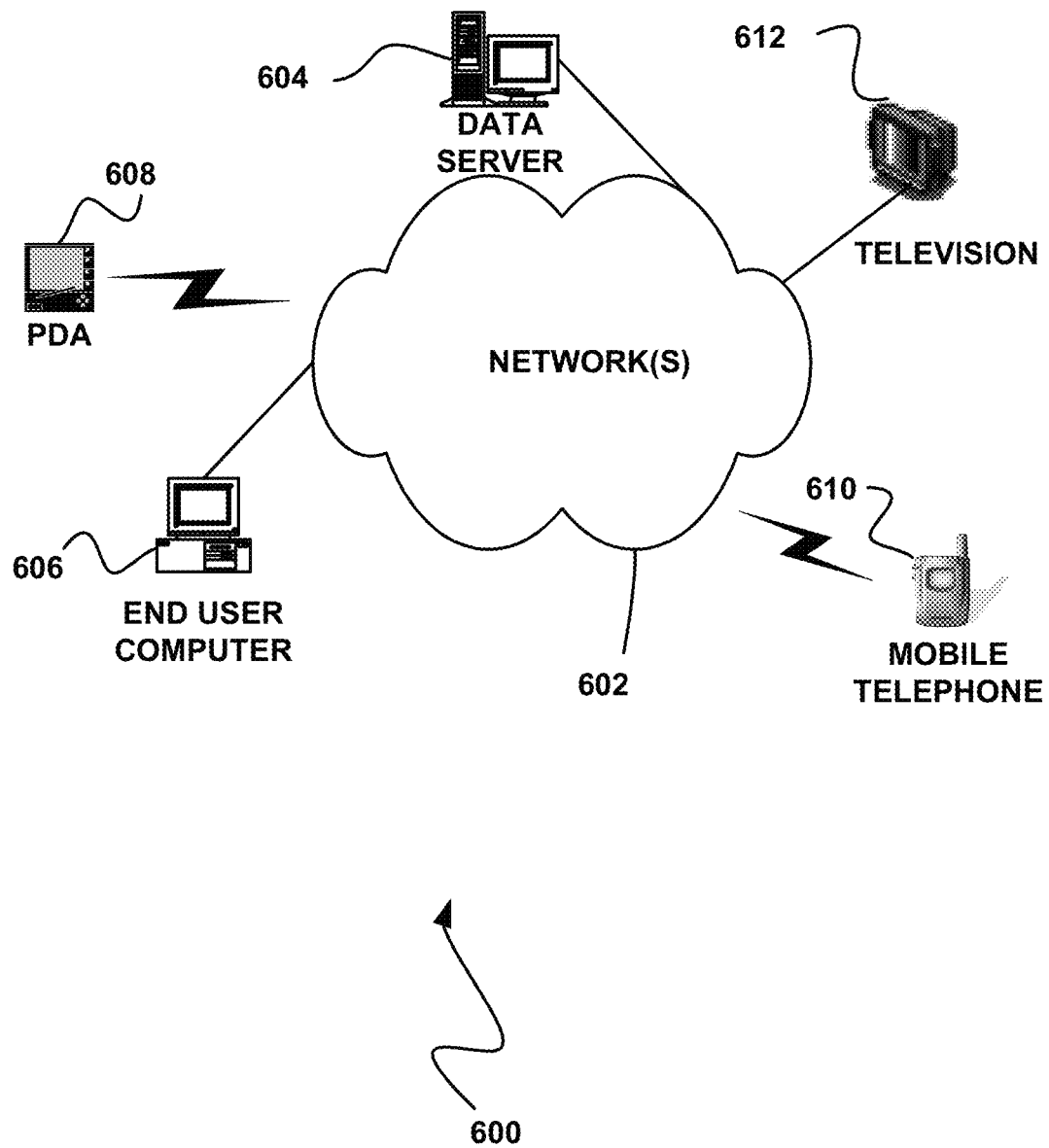
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
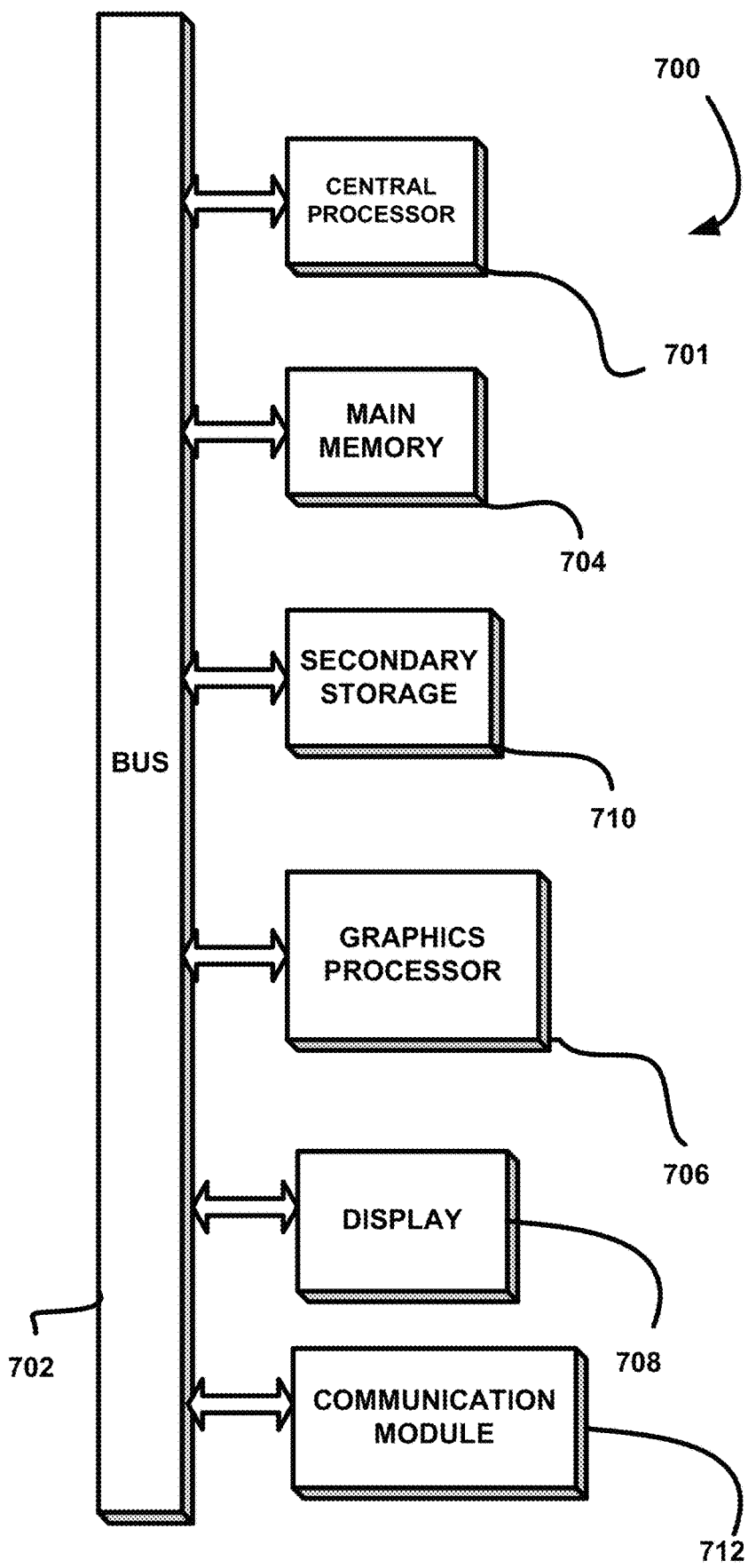
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    retrieving, by a tagging module embedded in an application of a client device, a tagging model specific to the application, the tagging model specifying rules tuned for the application for tagging output data of the application, wherein the tagging model is retrieved from an external system storing a plurality of tagging models specific to a plurality of different applications;
    intercepting, by the tagging module, data output by the application for transfer over a network to an analytics system;
    accessing, by the tagging module, the tagging model specific to the application;
    examining, by the tagging module, the data output by the application to identify characteristics of the data; and
    tagging, by the tagging module, the data output by the application with enrichment information by applying the rules specified by the tagging model to the characteristics of the data;
    providing, by the tagging module, the data tagged with the enrichment information to the analytics system that uses the enrichment information to interpret and analyze the data output by the application.

2. The method of claim 1, wherein the tagging module periodically queries the external system for an up-to-date version of the tagging model.

3. The method of claim 1, wherein the enrichment information includes data categorization information.

4. The method of claim 1, wherein the rules include different categorizations for different patterns and keywords.

5. The method of claim 1, wherein the identified characteristics include at least one of a keyword or a data pattern.

6. The method of claim 1, wherein the analytics system is a server-side analytics system, and wherein the data tagged with the enrichment information is provided to the analytics system by:
    posting the data tagged with the enrichment information to a data collector system accessible to the analytics system,
    wherein the analytics system retrieves the data tagged with the enrichment information from the data collector.

7. The method of claim 1, wherein the tagging module performs the tagging of the data output by the application at runtime of the application.

8. The method of claim 1, wherein the tagging module is generic for use by the plurality of different applications.

9. The method of claim 1, wherein the tagging module is a software component embedded in the application.

10. The method of claim 1, further comprising:
    receiving, by the tagging module, a refined version of the tagging model from the external system;
    tagging subsequent data output by the application according to the refined version of the tagging model.

11. A computer program product embodied on a non-transitory computer readable medium, comprising computer code for:
    retrieving, by a tagging module embedded in an application of a client device, a tagging model specific to the application, the tagging model specifying rules tuned for the application for tagging output data of the application, wherein the tagging model is retrieved from an external system storing a plurality of tagging models specific to a plurality of different applications;
    intercepting, by the tagging module, data output by the application for transfer over a network to an analytics system;
    accessing, by the tagging module, the tagging model specific to the application;
    examining, by the tagging module, the data output by the application to identify characteristics of the data; and
    tagging, by the tagging module, the data output by the application with enrichment information by applying the rules specified by the tagging model to the characteristics of the data;
    providing, by the tagging module, the data tagged with the enrichment information to the analytics system that uses the enrichment information to interpret and analyze the data output by the application.

12. The computer program product of claim 11, wherein the tagging system periodically queries the external system for an up-to-date version of the tagging model.

13. The computer program product of claim 11, wherein the enrichment information includes data categorization information.

14. The computer program product of claim 11, wherein the rules include different categorizations for different patterns and keywords.

15. The computer program product of claim 11, wherein the identified characteristics include at least one of a keyword or a data pattern.

16. A client device, comprising one or more processors, operable for:
    retrieving, by a tagging module embedded in an application of the client device, a tagging model specific to the application, the tagging model specifying rules tuned for the application for tagging output data of the application, wherein the tagging model is retrieved from an external system storing a plurality of tagging models specific to a plurality of different applications;
    intercepting, by the tagging module, data output by the application for transfer over a network to an analytics system;
    accessing, by the tagging module, the tagging model specific to the application;
    examining, by the tagging module, the data output by the application to identify characteristics of the data; and
    tagging, by the tagging module, the data output by the application with enrichment information by applying the rules specified by the tagging model to the characteristics of the data;

providing, by the tagging module, the data tagged with the enrichment information to the analytics system that uses the enrichment information to interpret and analyze the data output by the application.

17. The tagging system of claim 16, wherein the tagging system periodically queries the external system for an up-to-date version of the tagging model.

18. The tagging system of claim 16, wherein the enrichment information includes data categorization information.

19. The tagging system of claim 16, wherein the rules include different categorizations for different patterns and keywords.

20. The method of claim 1, wherein the enrichment data enables the analytics system to predict issues.

\* \* \* \* \*